3,092,500
DOUBLE COATING OF FOOD PRODUCTS TO PREVENT MOISTURE LOSS

Havard L. Keil, Clarendon Hills, Ill., assignor, by mesne assignments, to Armour and Company, Chicago, Ill., a corporation of Delaware
No Drawing. Filed Mar. 19, 1959, Ser. No. 800,391
12 Claims. (Cl. 99—166)

The present invention relates to the protection and preservation of foods. More particularly, it deals with a coating for foods, the manufacture of the coating and the packaging of foods therein.

The food industry is continually seeking to improve the packaging procedures employed. Each producer is desirous of making his products more attractive and desirable to purchasers. The growth of self-service marketing has given tremendous impetus towards this end for the housewife sees and compares competitive products as selections are made. Not only is it desirable to have an attractive appearing package but, since the housewife wishes to actually view the product she is considering purchasing the demand is for packages that are transparent. With some products, packages may be readily formed from transparent films to adequately solve the problem. Unfortunately, the solution is not that simple with all food products.

Those food products that incorporate substantial amounts of fats and oils present particular difficulties. If the fats or oils smear the inner side of the wrapper, the transparency and attractive appearance of the packaging material will be impaired. Some films or film forming materials are actually damaged by the presence of fats or oils. The grease may bleed through to the outer surface of the film. Where a film is to be sealed in the formation of the package e.g. heat sealing in the manufacture of vacuum packages, care must be taken not to get any fat or oil on the areas in which the seal is to be made for it will cause great difficulty in the production of a satisfactory bond. Special precautions may have to be observed in the application of many films and film forming materials with an attendant increase in the cost of manufacture. These problems are encountered with numerous food items, for example, meats, cheese, oleomargarine, etc. Because of toxicity problems, etc., some films or film forming materials must not be brought into contact with foods and means be provided for their separation if they are to be used in packaging foods.

There are available plastic vapor-barrier coating materials which have been used to form plastic coatings for foods. These would offer substantial advantages for use with meats where moisture loss is a problem. However, these cannot be used over many foods. If the food has a film of grease over all or portions thereof, e.g. most meats, butter, oleomargarine, cheese, etc., the plasic applied to that product will run off, just like water off a duck's back as the saying goes. As a result no plastic film will form. The presence of salt has the effect of causing the film that does form to be permeable to water vapor. A principal object of the present invention is to provide an undercoating for foods where plastic cannot be applied directly that will enable the plastic to be applied over the undercoat to form a vapor barrier about the food.

A principal object of my invention is to provide a coating for such foods which will act as a grease barrier and produce a food having no grease on the outer surface thereof. The coating I have devised for foodstuffs may be used as the complete packaging material. It will inhibit molding and oxidation and offer pretection against the salt rust condition often encountered in the manufacture of dry sausage items. It will give physical protection to the product against damage such as from rough handling. One of its most important advantages is its transparency. One can see clearly just what is inside the coating film. A label may be put on the product before it is coated and the label can be read without the slightest difficulty after the food and label have been coated. If a colored transparent film is desired, this often may be achieved, depeneding on the color desired, by a choice of coating material rather than resorting to the necessity of adding coloring to the film forming material.

While the coating material I have devised has application for use alone as a packaging material, it also has tremendous advantage for use as a precoating for products to be packaged in conventional films or film forming materials. Many of the well known films or film forming materials have water and/or water vapor barrier properties (both being referred to by the term water barrier properties), which are not substantially present in my film. Yet, as previously mentioned such films may be troubled by the presence of fats or oils. By first applying the coating material I have devised those fats and oils are sealed in so that they present no further problem. A conventional water impremeable film may be applied over my film with no further difficulty whatsoever. There will be no smearing of the outer film and the transparency of the finished package is determined almost completely by the transparency of the material used for the outer film. No sealing problems are encountered with the outer film. Film forming materials can be deposited over my film without special preparations. The complete package of the grease impermeable film over the product and the water impermeable film on the outside gives all the properties and protection that have been so long sought in the industry and at a relatively low cost.

The process I have devised is to apply a protein undercoat to the food before attempting to apply the vapor-barrier plastic coat to the food. The protein might be of animal origin, e.g. lean meat, poultry flesh, fish, flesh, gelatin, collagen, etc., or vegetable origin, e.g. wheat gluten powder, soya protein powder, etc. Of the unmodified proteins gelatin is believed to form the most preferable undercoat, but collagen runs it a close second. The results obtained from the use of some proteins can be improved by mixing that protein with another. However, the most satisfactory results have been obtained with modified proteins, one of which is the heavy metal gelatinate.

However, any modification of the protein should not be such as to render it hygroscopic nor should any hygroscopic material be mixed with the protein which is to be employed as an undercoat. A hygroscopic material will allow the salt to come through the undercoat and destroy the vapor barrier of the plastic dip employed thereover. Furthermore, a number of the plastic dips that might be used to form a water vapor barrier are water emulsions (and to the best of my knowledge these are the only types that have been approved to date by the governmental authorities for use over foods). A hygroscopic material in the undercoat will effect the properties of the plastic in such case, and is likely to prevent a water vapor barrier from being formed.

*Example I*

A solution of gelatin was prepared by heating a mixture of 20 parts of gelatin (275 Bloom) and 80 parts of water to 50° C. for one hour. Foam was skimmed from the surface and discarded. The solution was cooled to about 41° C. and sausages (frankfurts) were dipped therein. Frankfurts are a good test item because although they are rinsed with hot water after processing, they have a grease film about the surface that prevents the forming of a plastic coat thereover. A hard gel rapidly formed about the sausages. Within a few seconds the coated sausages were dipped in a Saran base plastic dip, hereinafter discussed, and upon removal a plastic film formed about the gelatin undercoat. Upon storage in a refrigerated space for a period of time the sausages did not exhibit any significant loss in weight indicating that a water vapor barrier had been formed about the sausages. Sausages not having a water vapor barrier thereabout stored under identical conditions exhibit a definite weight loss.

*Example II*

In this example edible collagen produced from animal skins, bones, and tendons was employed. Collagen can be made by the process described in Patent No. 2,485,957. Surface foam was skimmed and discarded. Sausages were dipped in the solution and upon removal a hard gel coating formed so that within a few seconds the coated sausages could be dipped in a Saran base plastic dip. A plastic film formed about the outside. Storage in a refrigerated area for a period of time indicated that a moisture barrier had been developed about the sausages.

*Example III*

One part of ground lean beef was mixed with two parts of water and passed through a colloid mill to give a meat emulsion of viscous consistency. Sausages were dipped therein. Upon removal the liquid on the sausage was coagulated by holding a few minutes in a hot air blast at 71° C. The coated sausages were dipped in a Saran base dip and stored in a cooler. A lack of significant weight loss indicated a moisture vapor barrier had been established.

Other meats, e.g. lean pork, lean veal, lean mutton, poultry flesh, fish flesh, animal liver and hearts, and edible tripe, may be utilized in the same manner to form an undercoat. In some instances it may be desirable to employ several dippings (in the meat emulsion) and coagulating steps to obtain a good undercoat.

A faster dipping operation as well as a thicker undercoat may be obtained by mixing a small amount of gelatin or collagen solution into the meat emulsion. This will serve to prevent excessive run-off of the undercoat upon dipping and there is less danger of the undercoat coming off when the food product is dipped into the plastic.

*Example IV*

Forty parts of dry egg white were dispersed in 60 parts of water at room temperature. Foam was skimmed off. Sausages were dipped in the 27° C. solution and dried by hanging for one hour at room temperature. The coated sausages were dipped in a plastic dip of a type hereinafter outlined and stored in a refrigerated space. No significant weight loss developed.

*Example V*

Sodium caseinate powder 20 parts was dispersed in 80 parts of water by heating at 50° C. Foam was skimmed from the surface while hot. After cooling the solution to 44° C., sausage items were dipped therein and hung at room temperature for one hour. The coated sausages were dipped in a plastic dip and stored in a refrigerated space. No significant weight loss developed.

*Example VI*

Soya protein powder 20 parts was dispersed in 80 parts of water by warming at 50° C. Foam was skimmed from the surface while hot and the solution cooled to 24° C. Sausages were dipped into the solution and allowed to hang for one hour at room temperature.

No significant weight loss after the coated sausages were dipped in a plastic dip and stored in a refrigerated space.

Wheat gluten powder may be utilized in the same manner as the soya protein powder.

I have also devised metal gelatinate which is particularly suitable for such an undercoat or which may be used alone to enrobe food products. This metal gelatinate is a gelatinate of a non-toxic heavy metal which may be formed in situ or applied in liquid form to the food by dipping, cascading or brushing. The liquid gelatinate is dried after the food is enrobed therein. This coating will dry rapidly at room temperature to leave a non-tacky surface. The finished coating is transparent, relatively tough and seals in any fat or oil in or on the foodstuff.

The heavy metal gelatinate is prepared by introducing a salt of a heavy metal into an aqueous gelatin solution. A heavy metal is defined as one having a specific gravity equal to or greater than 2.7. The heavy metal reacts with the protein of the gelatin to form a complex termed a gelatinate. Since the coating is to be employed on foods, the heavy metal used should be non-toxic. Any acid salt of the metal may be employed. While substantially any grade of gelatin can be used, e.g. 80 to 275 Bloom, I prefer to use a high grade gelatin, e.g. 275 Bloom, because the larger molecules give a tougher coating. No heat is required for the reaction, but the temperature should be above that at which the gelatin will gel. After the reaction is complete, which is substantially instantaneous, the food may be dipped in the resultant liquid gelatinate. The amount of the metal gelatinate in the dip will be determined primarily by the thickness of the coating to be applied. An excellent coating is obtained by using a solution of 20% solids. The preferable range of solids in the solution is between about 5% solids and about 30% solids by weight.

Another procedure for forming the gelatinate coating involves a two step coating process. The food to be coated is first dipped in a gelatin solution to form a gelatin coating on the food and thereafter is dipped in a solution of a salt of a non-toxic heavy metal. The metal will react with the gelatin of the coating produced by the first dipping step to produce a gelatinate coating. The amount of the depth of the gelatin coating that will be converted to a gelatinate will depend on the extent to which the gelatin coating has dried before dipping in the salt solution, the concentration of the salt solution, the particular metal salt employed, etc. This process generally will not be as highly regarded as the one first described since it involves an additional dipping, brushing or cascading of material onto the product and because not all the coating will necessarily be a gelatinate.

After the protein coating has been applied to the foodstuff, the coated food may be encased in a water and/or water vapor impermeable film. For example, a sheet of polyvinylidene chloride plastic (commonly sold under the trademark Saran) or rubber hydrochloride (sold under the trademark Pliofilm) may be wrapped and sealed about the coated food. The coated food may be placed in a bag formed of one of the same films with the bag subsequently being sealed, with or without first vacuumizing the bag. Another procedure would be to dip the coated food into another film forming material to provide a water and/or water vapor barrier film about the protein coating. One dip for this purpose might be a 20% solution of a copolymer of 80% vinylidene chloride and 15% acrylonitrile (or the product marketed commercially as Saran F-120) in methyl ethyl ketone. A "Saran" base dip is marketed under the trademark Viskote which is suitable for applying a water impermeable film over the protein coating. Usually these "Saran" base dips require special surface preparations in order to obtain a good film, but this is not necessary after having first applied a protein undercoating. Another plastic dip is set forth in U.S. Patent 2,840,475. The plastic dips can not be used over fresh meats because of the water and fat present, but after sealing the fresh meat in a protein undercoat a "Saran" base dip may be used.

*Example VII*

Ten and six-tenths (10.6) pounds of 275 Bloom gelatin was mixed into 46.6 pounds of cold water and the lot heated in a water bath at about 180° F. until the solution reached 142° F. After skimming the foam from the solution, 2.12 pounds of aluminum sulfate (N.F. grade) dissolved in 4.25 pounds of hot water was stirred into the gelatin solution. Before using the resultant product as a dip it was cooled to about 118-120° F. Salami sausages, both the Genoa type and the B.C. type, were hung on hooks and dipped in the resultant product, the aluminum gelatinate. After dipping, the aluminum gelatinate coating hardened by air drying at room temperature in a matter of seconds.

A dip similar to that described above has been successfully used to coat oleomargarine, shortening, cheese, slices of fresh and frozen beef, various sausages, e.g. cervelat, salami, etc., Canadian bacon and boned, rolled hams. The coating obtained is entirely free from grease and will remain that way even when not under refrigeration. It is substantially colorless and transparent.

Foodstuffs coated with aluminum gelatinate as just described have been dipped a second time in a "Saran" base dip, previously described. The two coats have been applied in rapid sequence and without any special preparations before or between the coatings thus establishing the commercial practicality of the process and coatings. Upon holding dry sausage items so coated, no salt rust or mold developed. The loss in weight during the holding period was relatively small. Product so coated has a clear glazed appearance. The covering is tight about the product with no wrinkles, etc. therein.

To produce the aluminum gelatinate I prefer to use aluminum sulfate as the salt since it is relatively cheap and is easy to handle. However, other acid salts such as aluminum chloride could be employed. The salt should be relatively pure, at least N.F. grade, since impurities may result in a coloring of the coating and a lack of transparency. In applications where these factors are not a problem a less pure grade of salt could be employed.

*Example VIII*

The quantities and procedures of Example VII were used except that zinc sulfate was substituted for the aluminum sulfate to produce a zinc gelatinate solution. Meats were dipped into the zinc gelatinate solution with the gelatinate coating quickly drying in air to a clear transparent covering having a slight amber cast.

Upon reacting the acid salts of some of the heavy metals, e.g. iron and chromium, with a gelatin solution it will be found that the resultant gelatinate hardens to an extent as to be unsuitable for use as a dip to obtain a coating. In this case particularly the second procedure for obtaining the gelatinate coating may be employed.

*Example IX*

A water solution of 275 Bloom gelatin was made of which 18.5% by weight was gelatin and 81.5% was water. A 180° F. water bath was used to heat the solution until all the gelatin was dissolved. After skimming the foam, the solution was cooled to about 115° F. and salami sausage was dipped therein. Upon removal from the solution the coating was air dried for 15 minutes and the sausage was then dipped in a solution of iron chloride (33.3% iron chloride and 66.7% water, by weight) the temperature of which was 115° F. The resultant coating had a non-tacky surface and was impervious to oil or grease. It had a greenish color and was transparent.

The present application is a continuation-in-part of my prior application No. 688,410, filed October 7, 1957, now Patent No. 2,971,849.

The foregoing detailed description is only for clearness of understanding and for the purpose of complying with 35 U.S.C. 112 and I do not desire to be limited to the exact details described for obvious modifications will occur to persons skilled in the art.

I claim:

1. The method of protecting a food product against change of moisture content comprising the steps of covering said product with a water miscible protein in a water carrier, solidifying the protein on the product to form an undercoat on said product, and dipping said coated product in a plastic dip solution including a vinylidene chloride copolymer as a major component to form a water and water vapor barrier over said undercoat.

2. A process for coating an edible substance comprising the steps of enrobing said substance in a water miscible protein, and applying a liquid plastic having water and water vapor barrier properties to said enrobed substance to form a coating over said enrobed substance.

3. A process for coating an edible substance comprising the steps of covering said substance with a liquefied water miscible protein, solidifying said liquefied protein to form a coat of protein thereabout, and covering said coat with a liquid plastic having water and water vapor barrier properties to form a coating over said protein-coated substance.

4. The method for forming a coat for an edible substance comprising the steps of applying an undercoat of gelatin to said substance, and applying a liquid plastic having water and water vapor barrier properties to said undercoated substance to form a coat over said undercoated substance.

5. The method of forming a coat for an edible substance comprising the steps of applying an undercoat of non-toxic, metal gelatinate to said substance, and applying a liquid plastic having water and water vapor barrier properties to said undercoated substance to form a coat over said undercoated substance.

6. The method of forming a coat for an edible substance comprising the steps of applying an undercoat of egg white to said substance, and applying a liquid plastic having water and water vapor barrier properties to said undercoated substance to form a coat over said undercoated substance.

7. The method of forming a coat for an edible substance comprising the steps of applying an undercoat of sodium caseinate to said substance, and applying a liquid plastic having water and water vapor barrier properties to said undercoated substance to form a coat over said undercoated substance.

8. The method of forming a coat for an edible substance comprising the steps of applying an undercoat of collagen to said substance, and applying a liquid plastic having water and water vapor barrier properties to said undercoated substance to form a coat over said undercoated substance.

9. The method of forming a coat for an edible substance comprising the steps of applying an undercoat of vegetable protein to said substance, and applying a liquid plastic having water and water vapor barrier properties to said undercoated substance to form a coat over said undercoated substance.

10. The method of forming a coat for an edible substance comprising the steps of applying an undercoat of animal protein to said substance, and applying a liquid plastic having water and water vapor barrier properties to said undercoated substance to form a coat over said undercoated substance.

11. The method of packaging a food product comprising applying a coating of a gelatinate of a nontoxic heavy metal to said product and covering and said coating with a liquid plastic having water and water vapor barrier properties to form a coat over said coated product.

12. The method of applying a coating having water and water vapor properties to a food product having an oleaginous component comprising the steps of applying a water miscible protein undercoat to said product and applying a plastic coating having water and water vapor barrier properties to said undercoat.

References Cited in the file of this patent

UNITED STATES PATENTS

| | | |
|---|---|---|
| 2,245,576 | Dickinson et al. | June 17, 1941 |
| 2,811,453 | Childs | Oct. 29, 1957 |
| 2,905,561 | Barnett et al. | Sept. 22, 1959 |
| 2,971,849 | Keil | Feb. 14, 1961 |